United States Patent
McShane (10) Patent No.: US 11,461,319 B2
(45) Date of Patent: Oct. 4, 2022

(54) DYNAMIC DATABASE QUERY EFFICIENCY IMPROVEMENT

(71) Applicant: Alan McShane, Dublin (IE)

(72) Inventor: Alan McShane, Dublin (IE)

(73) Assignee: Business Objects Software, Ltd., Dublin (IE)

( * ) Notice: Subject to any disclaimer, the term of this patent is extended or adjusted under 35 U.S.C. 154(b) by 896 days.

(21) Appl. No.: 14/507,562

(22) Filed: Oct. 6, 2014

(65) Prior Publication Data

US 2016/0098448 A1    Apr. 7, 2016

(51) Int. Cl.
*G06F 16/2453*    (2019.01)
*G06F 40/205*    (2020.01)

(52) U.S. Cl.
CPC ...... *G06F 16/24534* (2019.01); *G06F 40/205* (2020.01)

(58) Field of Classification Search
CPC ......... G06F 17/30442; G06F 17/30463; G06F 17/30448; G06F 17/30545; G06F 17/30864
USPC ...................................................... 707/713
See application file for complete search history.

(56) References Cited

U.S. PATENT DOCUMENTS

| | | | |
|---|---|---|---|
| 6,411,951 B1 | 6/2002 | Galindo-Legaria et al. | |
| 2002/0010706 A1* | 1/2002 | Brickell | G06F 17/30312 |
| 2003/0167272 A1 | 9/2003 | Sinnott, Jr. | |
| 2006/0031200 A1* | 2/2006 | Santosuosso | G06F 17/30306 |
| 2008/0071748 A1* | 3/2008 | Wroblewski | H03M 7/30 |
| 2008/0126393 A1* | 5/2008 | Bossman | G06F 17/30442 |
| 2009/0100004 A1* | 4/2009 | Andrei | G06F 17/30424 |
| 2009/0327214 A1* | 12/2009 | Richardson | G06F 17/30469 |
| 2011/0282864 A1* | 11/2011 | Collins | G06F 17/30445 707/719 |
| 2012/0023092 A1* | 1/2012 | Egan | G06F 17/30463 707/718 |
| 2012/0191698 A1* | 7/2012 | Albrecht | G06F 17/30442 707/718 |
| 2012/0278305 A1* | 11/2012 | Wei | G06F 17/30477 707/713 |

(Continued)

FOREIGN PATENT DOCUMENTS

EP    2 110 761 A2    10/2009

OTHER PUBLICATIONS

"SAP HANA Troubleshooting and Performance Analysis Guide," Document Version: 1.1, Chapter 3.9, Aug. 21, 2014, 32 pages.

(Continued)

*Primary Examiner* — Hosain T Alam
*Assistant Examiner* — Nicholas E Allen
(74) *Attorney, Agent, or Firm* — Klarquist Sparkman, LLP (57) ABSTRACT

Examples of dynamic database query efficiency improvement are provided herein. Query portions of a received database query can be identified as candidates for replacement. The candidates for replacement can be query portions that reduce the efficiency of the query. Alternative queries can be determined that include substitute query portion(s) in place of candidate(s) for replacement. An expected performance of the alternative queries can be determined. Based at least in part on the expected performance of the alternative queries, one or more alternative queries can be selected as replacement database queries for the received database query.

18 Claims, 8 Drawing Sheets

(56) References Cited

U.S. PATENT DOCUMENTS

| | | | | |
|---|---|---|---|---|
| 2012/0310916 | A1* | 12/2012 | Abadi | G06F 17/30445 707/713 |
| 2013/0073586 | A1* | 3/2013 | Aubry | G06F 17/30477 707/769 |
| 2013/0117257 | A1* | 5/2013 | Meijer | G06F 17/30442 707/719 |
| 2013/0124525 | A1* | 5/2013 | Anderson | G06F 17/30286 707/737 |
| 2013/0151505 | A1* | 6/2013 | Yoon | G06F 17/30442 707/718 |
| 2013/0198217 | A1* | 8/2013 | Narula | G06F 11/3672 707/759 |
| 2014/0025701 | A1* | 1/2014 | Zhu | G06F 17/30389 707/765 |
| 2014/0089294 | A1* | 3/2014 | Shankar | G06F 16/24524 707/718 |
| 2014/0095469 | A1* | 4/2014 | Chen | G06F 17/30466 707/714 |
| 2014/0156633 | A1* | 6/2014 | Duan | G06F 17/30442 707/713 |
| 2014/0181072 | A1* | 6/2014 | Wong | G06F 16/24545 707/713 |
| 2014/0280280 | A1* | 9/2014 | Singh | G06F 17/30469 707/759 |
| 2014/0280373 | A1* | 9/2014 | Raitto | G06F 17/30292 707/803 |
| 2016/0098448 | A1* | 4/2016 | McShane | G06F 17/2705 707/713 |

OTHER PUBLICATIONS

"SAP HANA Developer Guide," Document Version: 1.1, Chapter 5.2.8, Aug. 21, 2014, 24 pages.

Franz, "How to make informed design choices—Where to find in-depth information," http://scn.sap.com/thread/3299421, 5 pages, Jan. 28, 2013 (accessed Oct. 6, 2014).

Hesch, "HANA Rules of Thumb," *SAP HANA and In-Memory Computing*, http://scn.sap.com/community/hana-in-memory/blog/2013/02/01/hana-rules-of-thumb, 2 pages, Feb. 1, 2013 (accessed Oct. 6, 2014).

Peterson, "Alternative to MSSQL With statement, temp tables? SAP HANA," http://scn.sap.com/message/14733368, 3 pages, May 2, 2013, (accessed Oct. 7, 2014).

Hesch, "Thinking in HANA—Part 1: Set Operators," Version 5, http://scn.sap.com/docs/DOC-52910, 24 pages, Mar. 2, 2014 (accessed Oct. 7, 2014).

Hesch, "CE function trick #1—Efficient cross join," Version 1, http://scn.sap.com/docs/DOC-41218, 3 pages, May 9, 2013 (accessed Oct. 7, 2014).

Hesch, "CE function trick #2—Efficient minus operation," Version 3, http://scn.sap.com/docs/DOC-41219, 2 pages, May 9, 2013 (accessed Oct. 7, 2014).

Appleby, "6 Golden Rules for New SAP HANA Developers," *SAP HANA and In-Memory Computing*, http://scn.sap.com/communnity/hana-in-memory/blog/2013/12/29/6-golden-rules-for-new-s . . . , 14 pages, Dec. 29, 2013 (accessed Oct. 7, 2014).

Appleby, "SAP HANA—a guide to Documentation and Education," Version 5, http://scn.sap.com/docs/DOC-57345, 5 pages, Aug. 11, 2014 (accessed Oct. 7, 2014).

Tangudu, "SAP HANA: Dynamic Ranking using Script based (SQL Script) Vs Graphical Calculation view Vs Script based (CE Functions)," *SAP HANA and In-Memory Computing*, http://scn.sap.com/community/hana-in-memory/blog/2014/01/10/sap-hana-ranking-using-g . . . , 4 pages, Jan. 10, 2014 (accessed Oct. 7, 2014).

"SAP HANA SQLScript Reference," Document Version: 1.1, Chapter 9, Aug. 21, 2014, 11 pages.

Extended European Search Report, European Patent Application No. 14004375.3, 7 pages, dated Mar. 17, 2015.

* cited by examiner

| Rule Name | Phase(s) | Match criteria | Alternative |
|---|---|---|---|
| Parallelisation barrier: local variables | Parallelization checks | Local variables | Remove unused local variables, replace with constants, change to input variables, convert imperative logic |
| Parallelisation barrier: imperative logic | Parallelization checks | If, while, for etc. | |
| Reduce use of cursors | Parallelization checks | Cursor statement | Automatic rewrite – e.g. switch to a join |
| Switch to SQL Engine | Engine checks | Calc view XML with flag not set | Turn flag on in XML |
| Switch to CE functions | Engine checks | Some CE functions or no CE functions at all. ("CE_...") | Rewrite in CE if possible to convert |
| Read/write stored procedure when read only | DML checks | No DML (INSERT, UPDATE, DELETE), Dynamic SQL | Add "READS SQL DATA" to create procedure section |
| OLAP engine hint | Apply hints | GROUP BY clause | Add hints |
| Case vs. Union | Case statement optimization | "case" or "union" | |
| Case vs. decision tables | Case statement optimization | "case" statement | Switch to decision table implementation |
| Switch ITABs to WITH | General optimization | "= select" | Change ITABs to WITH clauses and remove colon before ITAB use |
| Reduce number of non-eqi joins | Join optimization | A nonequi (or theta) join is an inner join statement that uses an unequal operation (i.e: <>, >, <, !=, BETWEEN, etc.) | |
| Reduce use of NOT IN | General optimization | "NOT IN" | Switch to NOT EXISTS |

FIG. 6

TABLE: Sample times over 5 executions in milliseconds (ms) excluding effect of result caching.

| Type of object / SQL | Approach | 21 | 2,121 | 210,021 | 2,100,021 | Scalability (performance as a function of volume) | Comment |
|---|---|---|---|---|---|---|---|
| Plain SQL approach. | | | | | | | |
| Plain SQL | 1. CASE | 7 | 8 | 48 | 93 | Improves with volume (non-linear) | |
| Plain SQL | 2. ABS function | 7 | 8 | 36 | 79 | Improves with volume (non-linear) | Easy to read |
| Plain SQL | 3. UNION ALL | 8 | 8 | 30 | 213 | Better at low volumes, less efficient at higher volumes (non-linear) | Two engines involved, ROW (for UNION ALL) and COLUMN. |
| Stored procedure and data modeling approaches. | | | | | | | |
| Modelled view | 4. Graphical calculation view | 6 | 7 | 28 | 133 | Scales linearly | Performs well but there is extra overhead of data modelling. |
| Stored Procedure | 5. CE functions only. CE_UNION (-1 * negative volumes approach) | 8 | 8 | 23 | 143 | Scales linearly | Similar to graphical calculation view but easier to maintain source code. |
| Stored Procedure | 6. CE functions only. Abs function approach (no union required) | 7 | 7 | 34 | 211 | | |
| Stored Procedure | 7. Plain SQL stored procedure with UNION ALL operator | 15 | 21 | 143 | 1051 | Less efficient across volume sizes | |
| Stored Procedure | 8. Plain SQL stored procedure with CE_UNION_ALL instead of UNION ALL | 8 | 8 | 35 | 117 | Improves with volume (non-linear) | |

DYNAMIC DATABASE QUERY EFFICIENCY IMPROVEMENT

BACKGROUND

Software applications increasingly access, retrieve, process, or otherwise interact with vast quantities of data typically stored in databases or other data stores. Such data can often be accessed or processed in a variety of ways, some more efficient than others. Even within specific access methods, for example, performing database queries using structured query language (SQL) queries, efficiency can vary greatly depending upon how a query is constructed. As the amount of data increases, the effects of inefficient operations performed with the data are magnified, requiring additional computing resources and placing a substantial burden upon a system's ability to perform operations quickly.

DETAILED DESCRIPTION

The examples described herein generally improve the efficiency of database queries. Many queries, especially structured query language (SQL) queries, can be written in multiple ways to achieve an objective. The efficiency of the queries can vary widely depending upon many factors, including the operations (e.g. joins) and execution engines specified in a query as well as the structure and organization of the database being queried. The examples of database query efficiency improvement described herein provide efficient replacement database queries for a received database query. The replacement query is determined through application of query rules that identify potentially inefficient aspects of a query (and corresponding alternatives) and evaluation of multiple alternative queries formed from application of the rules to the received database query. The replacement queries are more efficient than the received query, allowing fewer computing resources to be used in performing database queries and reducing system latency through faster query response time. Examples are described below with reference to FIGS. 1-8.

Figure 1:
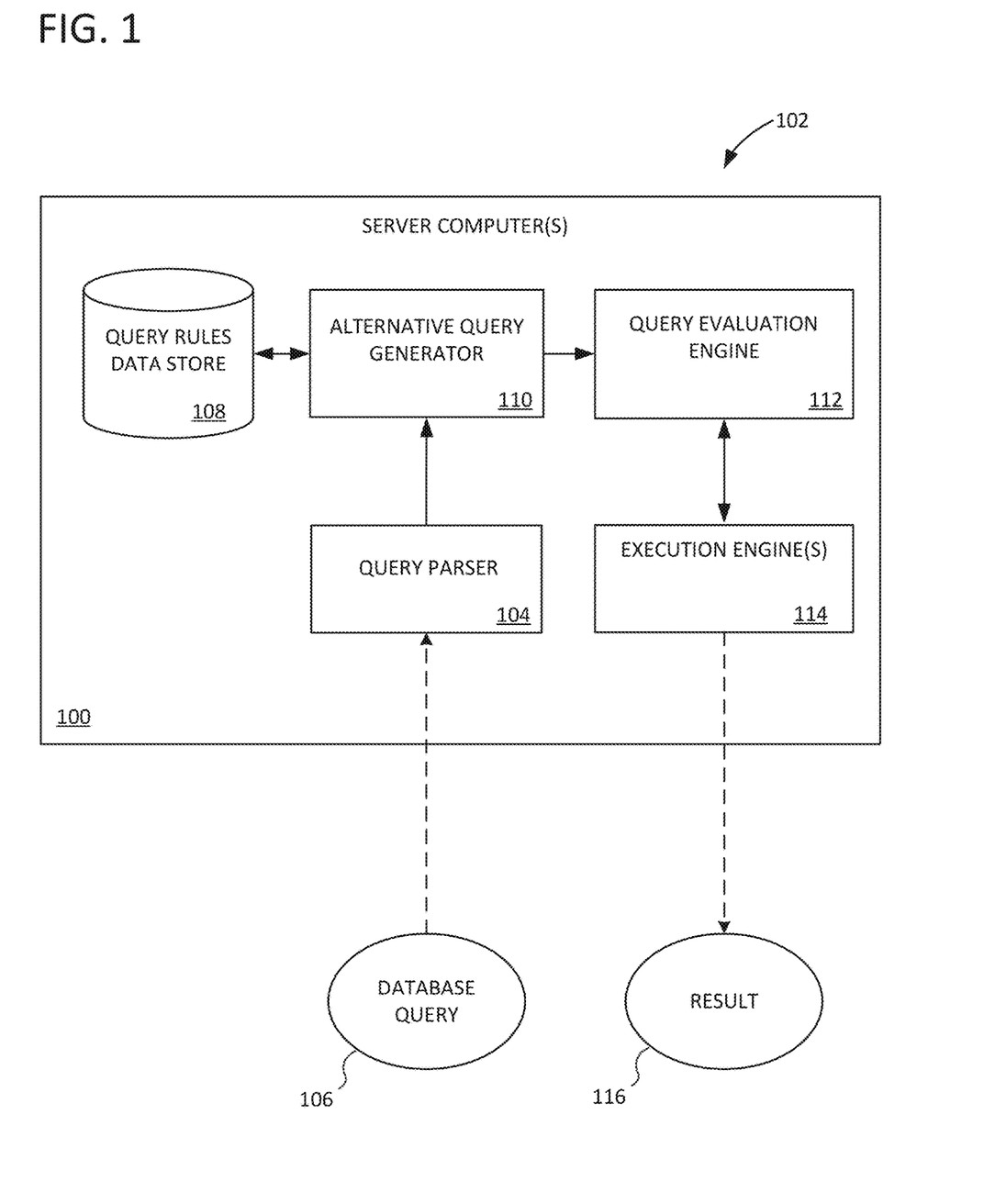
FIG. 1 is an example database query efficiency improvement system.

FIG. 1 illustrates one or more server computers 100 implementing a database query improvement system 102. System 102 includes a query parser 104 that receives a database query 106 and parses database query 106 into a plurality of query portions. Database query 106 can be, for example, a SQL query. A query portion can be any part or parts of a query, including an operator, a statement, a function, an expression, or a clause.

Figure 5:
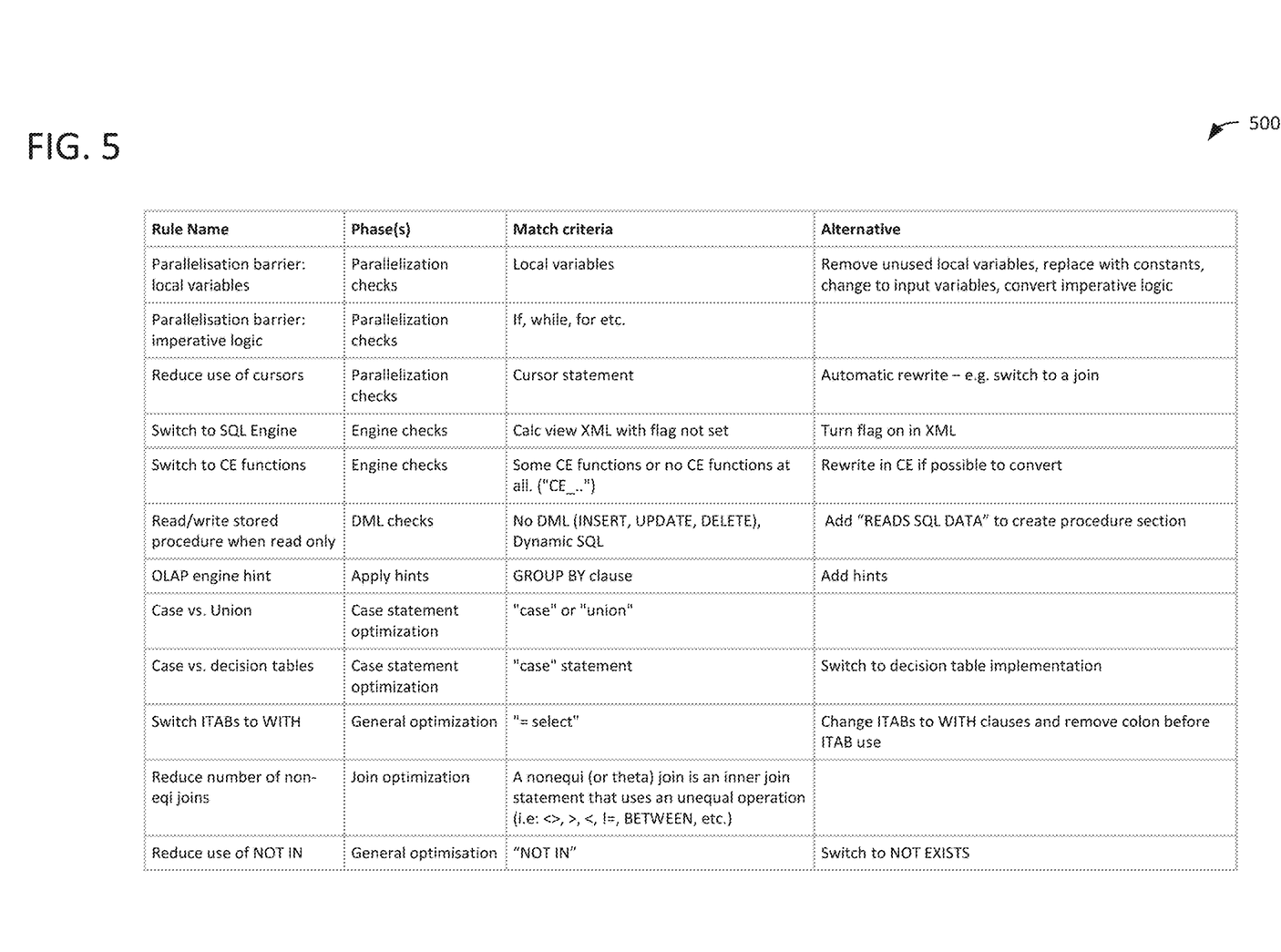
FIG. 5 is a diagram illustrating example query rules.

Query rules data store 108 contains a plurality of query rules. Query rules can take a variety of forms and formats. In some examples, query rules specify at least one or more query portions and one or more corresponding substitute query portions. For example, query rules may specify less-efficient query portions and corresponding more-efficient query portions that can be substituted for the less-efficient query portions to increase the overall efficiency of the database query. In some examples, the substitution is a direct substitution, and in other examples, aspects of database query 106 are changed to accommodate the substitution. Example query rules are shown in FIG. 5.

Query rules can be developed to address a number of aspects that contribute to inefficiency. For example, rules can be developed to: reduce the complexity of SQL statements; identify common sub-expressions and derive more efficient execution plans; exploit results at a finer grouping for computing coarser aggregations and return the different granularities of groups in distinct table variables; exploit the different capabilities of different calculation engines (e.g. online analytical processing (OLAP) engine vs. join engine); reduce dependencies in dataflow to increase parallelization and allow faster performance; reduce the use of cursors to increase parallel execution; and reduce the use of dynamic SQL. Rules can also be directed to other ways of increasing parallel processing, including: reducing the use of local scalar variables; using read-only procedures; reducing the use of imperative logic (e.g. if/else, while, for loops); reducing the use of SQL statements that are not assigned to a variable. Query rules can be designed to get around some of the limitations (or bugs) of an execution engine or a run-time optimizer. A run-time "optimizer" makes efficiency-related improvements to a query at run time, but the optimizer does not necessarily produce an optimum or best query. Query rules can also be designed to transform a query that was written for a previous version of an execution engine into a more efficient query that takes advantage of new features, functionality, or operation of a newer version of the execution engine.

Still other approaches to increase efficiency that can be implemented as rules include: turning plain SQL selects into equivalent calculation engine (CE) functions and vice/versa; replacing SQL selects on plain tables with modeled views; using filters to replace where clauses against views; reducing the use of "select*" on views to enable pruning; using unions to combine results; using UNION ALL instead of UNION; filtering early; reducing the number of joins; and reducing the amount that execution engines are mixed.

Query performance can be affected by a number of factors, including the structure of the database being queried and the order in which operations are carried out. In an in-memory columnar relational database, for example, certain operations are more efficient than others (e.g. column operations vs. row operations). In some examples, query rules are specific to the type of database being queried. In some examples, query rules can be ranked to reflect a typical amount of efficiency improvement and/or an ease of implementation. User input can also be used to determine a ranking. For example, members of a community of users can rank existing rules (e.g., based on empirical experience applying the rules) or propose additional rules.

In some examples, query rules are used to improve or "optimize" source SQL or stored procedures developed for one type of system (and/or type of database) for use with another type of system (and/or type of database). For example, query rules can be applied to a received query designed for use with a first database type to optimize the query for use with a second database type, in effect "converting" the query for use with the second database type.

Alternative query generator 110 determines a plurality of alternative queries based on the plurality of query portions and at least some of the plurality of query rules. The alternative database queries can take a variety of forms, including an alternative SQL query, an alternative query comprising a stored procedure, including a stored procedure using CE operators, a data modeling view query (e.g., a graphical model view query), an information model, a SQL view, or code that uses an underlying database engine application program interface (API). Example alternative queries are discussed below. Alternative database queries are more efficient (i.e. have a faster performance time and/or use fewer computing resources) than database query 106.

Query evaluation engine 112 evaluates alternative queries that are formulated through different modifications. In many cases, the improvements to database query 106 that provide the greatest increase in efficiency can be difficult to accurately predict due to characteristics of other portions of query 106, the characteristics of the data being queried (e.g. statistics describing the data), and/or run-time improvements (also referred to as "optimizations") that are made. Run-time optimizations can include column pruning, join ordering, removal of superfluous joins, etc. Run-time optimizations can be cost-based optimizations that take into account the statistics describing the data.

Query evaluation engine 112 determines an expected performance of at least some of the plurality of alternative queries. Based at least in part on the expected performance, query evaluation engine 112 selects one or more of the at least some of the plurality of alternative queries as replacement database queries for the parsed database query. Query evaluation engine 112 can, for example, determine expected performance by simulating alternative queries and/or performing alternative queries on a sample dataset. Simulation can be performed for SQL queries by using, for example, EXPLAIN PLAN to produce the execution plan and/or plan visualization tools.

In some examples, query evaluation engine 112 determines expected performance for alternative queries multiple times. In such examples, an average or other combination of the individual determinations of expected performance can be used to represent expected performance. This can improve the accuracy of performance results and limit the impact of outlier data (unusually high or low performance times or resource use). Query evaluation engine 112 can also consider system and implementation factors that affect performance, including current workloads (e.g. from other users) on execution engines or other computing resources.

Query evaluation engine 112 can also evaluate alternative queries for concurrency, that is, how many executions of a query can be run at the same time. For example, query evaluation engine 112 can execute the plurality of alternative queries sequentially and also execute the individual queries in parallel across multiple connections. In evaluating results, performance and efficiency of query executions can vary depending on factors such as system resources. Thus, in some examples, differences between queries below a threshold (e.g. 5%, 10%, etc.) are considered to be equivalent. In some such examples, a received query is not replaced with an alternative query when the difference is below the threshold.

Execution engine(s) 114 execute the replacement database query or queries on a dataset and provide a result 116.

Execution engine(s) 114 can be software applications that perform queries or portions of queries. Execution engine(s) can include OLAP engines, calculation engines, join engines, row engines, column engines, and SQL (or database) engines. Execution engines can also include Apache Spark™, Hive™, and Impala engines. Execution engines have different characteristics and performance abilities and therefore provide opportunities for different types of efficiency improvements. For example, an OLAP engine is typically tuned for processing of queries involving aggregation and star schema data layouts. The selection of the appropriate execution engine can be influenced by the query or portions of the query. The actual choice of engine(s) chosen by a run-time optimizer can be sub-optimal.

In examples in which system 102 is implemented on multiple server computer(s) 100, server computers 100 can be in communication via a network (not shown). The network can be the Internet, a local area network (LAN), a wireless local area network (WLAN), a wide area network (WAN), or other type of network, wired or wireless. Database query 106 can be received via the network, and result 116 can be provided via the network.

Figure 2:
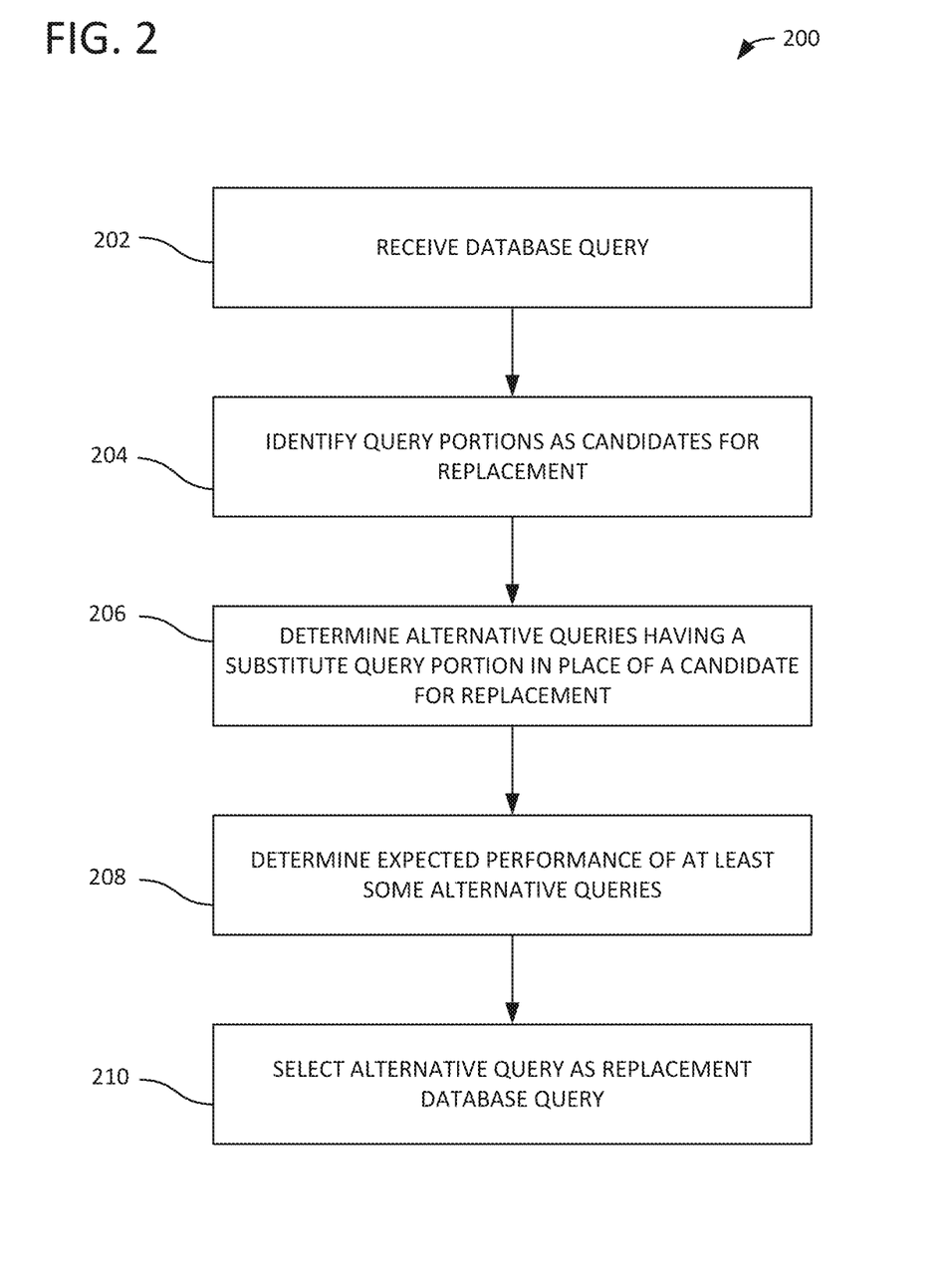
FIG. 2 illustrates an example method for improving the efficiency of a database query.

FIG. 2 illustrates a method 200 of improving the efficiency of a database query. In process block 202, a database query is received. One or more query portions of the database query are identified as candidates for replacement in process block 204. The candidates for replacement are query portions that contribute to the inefficiency of the database query. The candidates for replacement can be identified by, for example, parsing the received database query and comparing query portions identified through the parsing to a set of query rules having associated substitute query portions.

In process block 206, a plurality of alternative queries is determined. The respective alternative queries include at least one substitute query portion in place of at least one of the candidates for replacement. In process block 208, an expected performance of at least some of the plurality of alternative queries is determined Based at least in part on the expected performance of the at least some of the plurality of alternative queries, one or more alternative queries of the plurality of alternative queries are selected as replacement database queries for the received database query in process block 210. The replacement database queries are more efficient and/or have faster completion times than the received database query. In some examples, method 200 further comprises performing a replacement database query.

Figure 3:
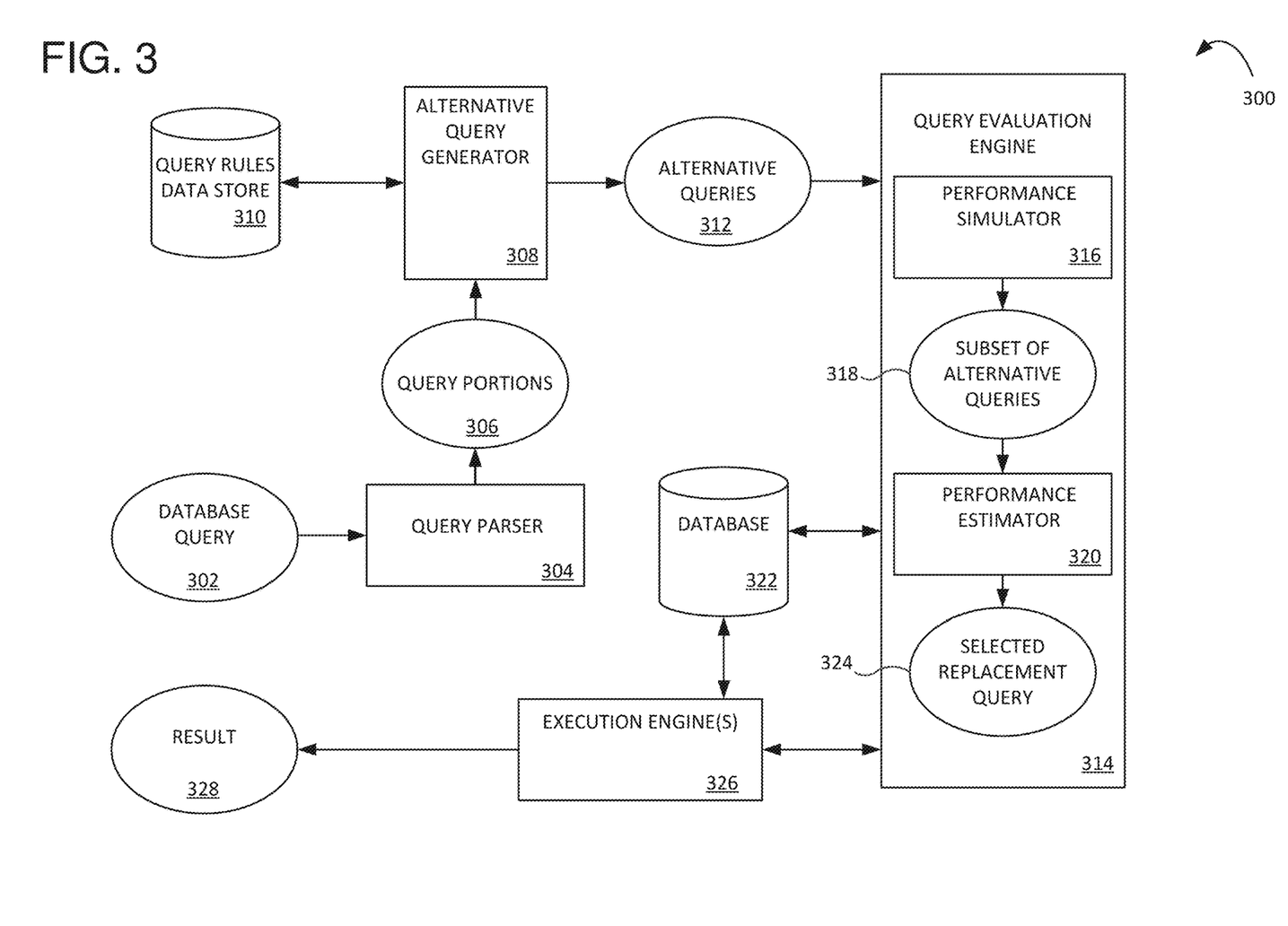
FIG. 3 is a diagram illustrating the operation of an example database query efficiency improvement system.

FIG. 3 illustrates the operation of an example database query efficiency improvement system 300. Database query 302 is received by query parser 304, which parses database query 302 into a plurality of query portions 306. Query portions 306 are provided to alternative query generator 308, which compares query portions 306 with query rules stored in query rules data store 310 to generate a plurality of alternative database queries 312. Alternative database queries 312 are provided to query evaluation engine 314.

Query evaluation engine 314 includes performance simulator 316. Performance simulator 316 simulates performance of the plurality of alternative queries and identifies a group 318 of the plurality of alternative queries having lower simulated query completion times than other alternative queries of the plurality of alternative queries. Performance simulator 316 provides an initial indication of performance, but run-time optimizations can also affect performance.

Performance estimator 320 provides additional evaluation of the group 318 of alternative queries by performing the alternative queries of group 318 on a sample dataset stored in database 322. The sample dataset is smaller than the full dataset against which database query 302 is configured to be performed. Because of the relatively small size of the sample dataset, performance estimator 320 can complete the alternative queries of group 318 quickly. In some examples, database 322 contains the full dataset, and the sample dataset is retrieved from the full dataset. By actually performing the alternative queries of group 318 on sample data, performance estimator 320 is able to estimate the effects of run-time optimization and provide a more accurate indication of which alternative query or queries is the most efficient (i.e. has the fastest completion time or uses the fewest computing resources). In some examples, performance estimator 320 performs the alternative queries of group 318 on sample datasets of different sizes. This approach addresses the question of scalability—that is, the performance of a particular alternative query with a larger (or smaller) dataset. In some examples, performance estimator 320 determines characteristics of performance across different sample sizes. Characteristics can include, for example, linearity of a curve fit to performance time as a function of sample time. In such examples, the greater the linearity of a curve for an alternative query, the more accurate extrapolation to a full data is. Scalability is illustrated further in FIGS. 6 and 7.

A replacement query or queries 324 is provided by query evaluation engine 314 to execution engine(s) 326. Execution engine(s) 326 performs replacement query or queries 324 on the full dataset to generate a result 328. The full dataset can be stored in database 322 or other data storage.

Figure 4:
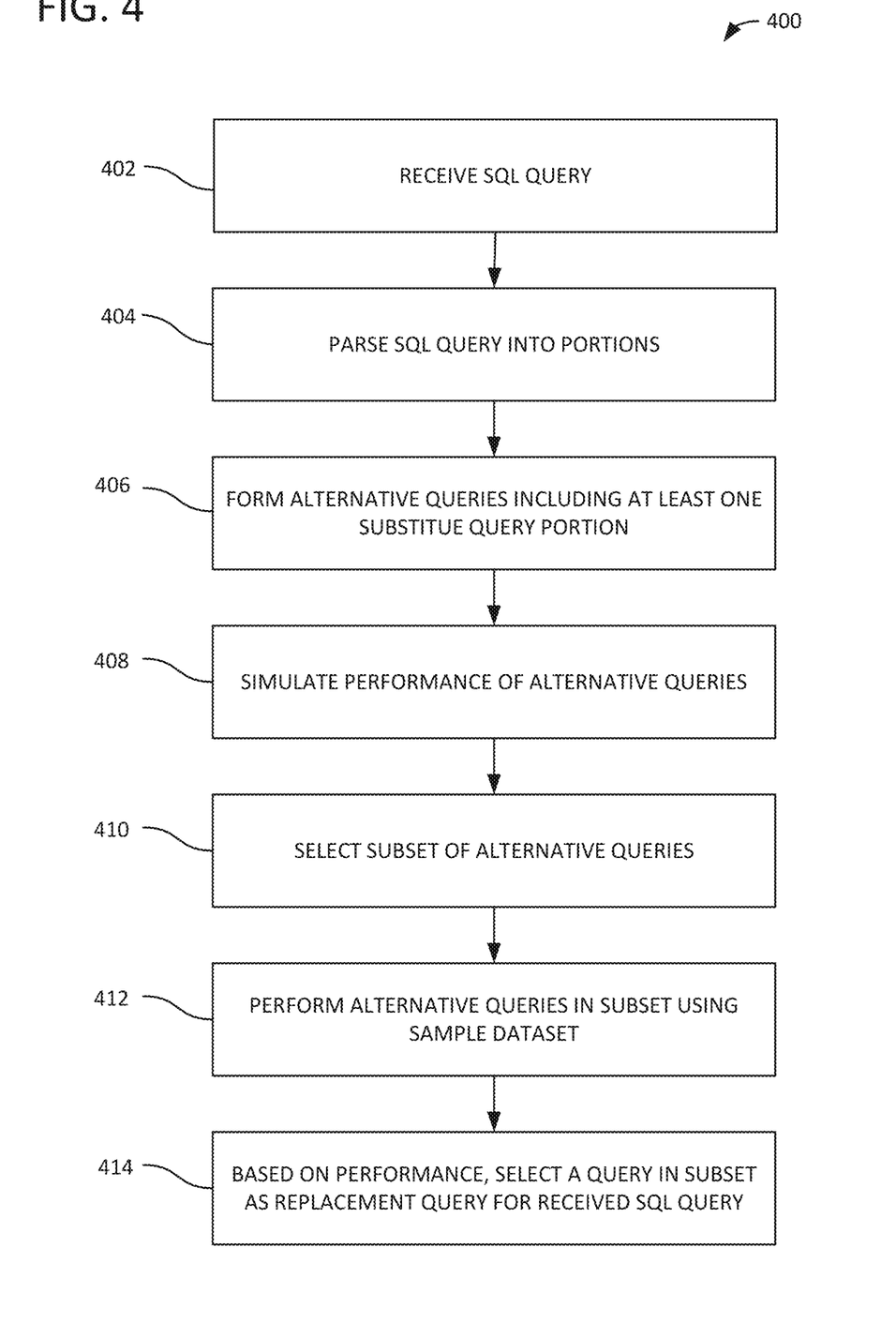
FIG. 4 illustrates an example method for improving the efficiency of a SQL query.

FIG. 4 illustrates a method 400 of improving the efficiency of a SQL database query. In process block 402, a SQL query is received. In process block 404, the SQL query is parsed into a plurality of query portions. A plurality of alternative queries is formed in process block 406. The plurality of alternative queries can be formed, for example, by identifying one or more query portions of the plurality of query portions as candidates for replacement based on a set of query rules. The respective alternative queries include at least one substitute query portion in place of at least one of the plurality of query portions. Alternative queries can be configured to, for example, perform a greater percentage of processing as parallel processing as compared to the received SQL query or decrease the number of relatively inefficient calculation engine operators as compared to the received SQL query. Example alternative queries include alternative SQL queries, alternative queries including a stored procedure, a data modeling view query, an information model, a SQL view, or code that uses an underlying database engine API.

In process block 408, the performance of the plurality of alternative queries is simulated. Based at least in part on results of the simulating, a subset of the plurality of alternative queries is selected in process block 410. In some examples, the alternative queries of the subset have a simulated completion time faster than a simulated completion time of the received SQL query. The respective alternative queries of the subset are performed using a sample dataset in process block 412. In process block 414, an alternative query of the subset is selected as a replacement query for the received SQL query based at least in part on the performance of the subset of alternative queries in process block 412.

FIG. 5 illustrates an example set 500 of query rules that can be stored, for example, in query rules data store 108 of FIG. 1 or query rules data store 310 of FIG. 3. The query rules in rule set 500 implement some of the efficiency improvement approaches discussed above with respect to FIG. 1.

Example SQL Query Improvement

In the following example of SQL query improvement, Table 1 (below) contains a field "VOLUME," which can be a positive or negative value. The "CALCULATED_VOLUME" column, determined through calculation, is a positive number. SQL can be used to transform the VOLUME column to contain just positive values.

TABLE 1

| DATASET | LOCATION_ID | PERIOD_ID | MATERIAL_ID | VOLUME | CALCULATED_VOLUME (positive number) |
|---|---|---|---|---|---|
| 1 | A | 1 | SFG A | 450 | 450 |
| 1 | A | 1 | SFG A | −100 | 100 |
| 1 | A | 2 | SFG A | 200 | 200 |
| 1 | A | 3 | SFG A | −200 | 200 |
| 1 | A | 4 | SFG A | −100 | 100 |
| 1 | A | 5 | SFG A | −50 | 50 |
| 1 | A | 6 | SFG A | 2,500 | 2500 |
| . . . 210,007 entries | | | | | |

A variety of implementation approaches are possible to accomplish this transformation, including a CASE statement; a UNION operator that combines results from two tables; an ABS function that calculates absolute value; a database API approach; a SQL view approach; and a data modeling approach.

CASE Statement Approach

Using EXPLAIN PLAN, details of the implementation of SQL using a CASE statement (below) can be determined. The query uses COLUMN SEARCH on the COLUMN engine, and the cost estimate is 1.0663410673356424×210 k records.

```
SELECT DATASET, LOCATION_ID, PERIOD_ID, MATERIAL_ID,
VOLUME,
    CASE
        WHEN VOLUME < 0 THEN −1 * VOLUME
        ELSE VOLUME
    END
    AS PRODUCTION
FROM "CASE_VS_UNION"."VOLUMES_TABLE";
```

Running the query reveals an execution time of 50.33 milliseconds (ms) (49.661 ms server processing time).

UNION Operator Approach

The UNION operator is a set-based operator that joins the results of one dataset to another. A UNION ALL combines result sets, including duplicates. The below query mixes ROW SEARCH (ROW engine) with two COLUMN SEARCHES on the COLUMN engine. The query was executed in 26.773 ms (25.934 ms server processing time).

```
SELECT DATASET, LOCATION_ID, PERIOD_ID, MATERIAL_ID,
VOLUME, -1 * VOLUME AS PRODUCTION
FROM "CASE_VS_UNION"."VOLUMES_TABLE"
WHERE VOLUME < 0
UNION ALL
SELECT DATASET, LOCATION_ID, PERIOD_ID, MATERIAL_ID,
VOLUME, VOLUME AS PRODUCTION
FROM "CASE_VS_UNION"."VOLUMES_TABLE"
WHERE VOLUME >= 0;
```

ABS Operator Approach

The ABS function returns the absolute value of the argument. The below query uses COLUMN SEARCH on COLUMN engine. The cost estimate (determined through EXPLAIN PLAN) is 1.0663410673356424×210 k records—the same as through the CASE approach. When executed, the query completed in 55.930 ms (55.183 ms server processing time).

```
SELECT DATASET, LOCATION_ID, PERIOD_ID, MATERIAL_ID,
VOLUME, ABS( VOLUME ) AS PRODUCTION
FROM "CASE_VS_UNION"."VOLUMES_TABLE";
```

Data Modeling (e.g. Graphical Calculation View) Approach

Using a data modeling approach (implemented using a graphical calculation view) (graphics not shown), the below query executed in 24.982 ms (24.66 ms server processing time.

```
SELECT "DATASET", "LOCATION_ID", "PERIOD_ID",
 "MATERIAL_ID", "VOLUME" FROM
 "_SYS_BIC"."case_vs_union/CV_UNION_APPROACH";
```

Of the approaches discussed above, the graphical calculation view approach was completed the fastest (but required modeling). The UNION operator approach was approximately as fast (24.66 ms vs. 25.934 ms), but could be implemented in plain SQL without modeling.

Example query rules for this dataset that improve efficiency are: if a query includes a CASE statement approach, substitute a UNION approach, and if a query includes an ABS function, substitute a UNION approach.

Figure 6:
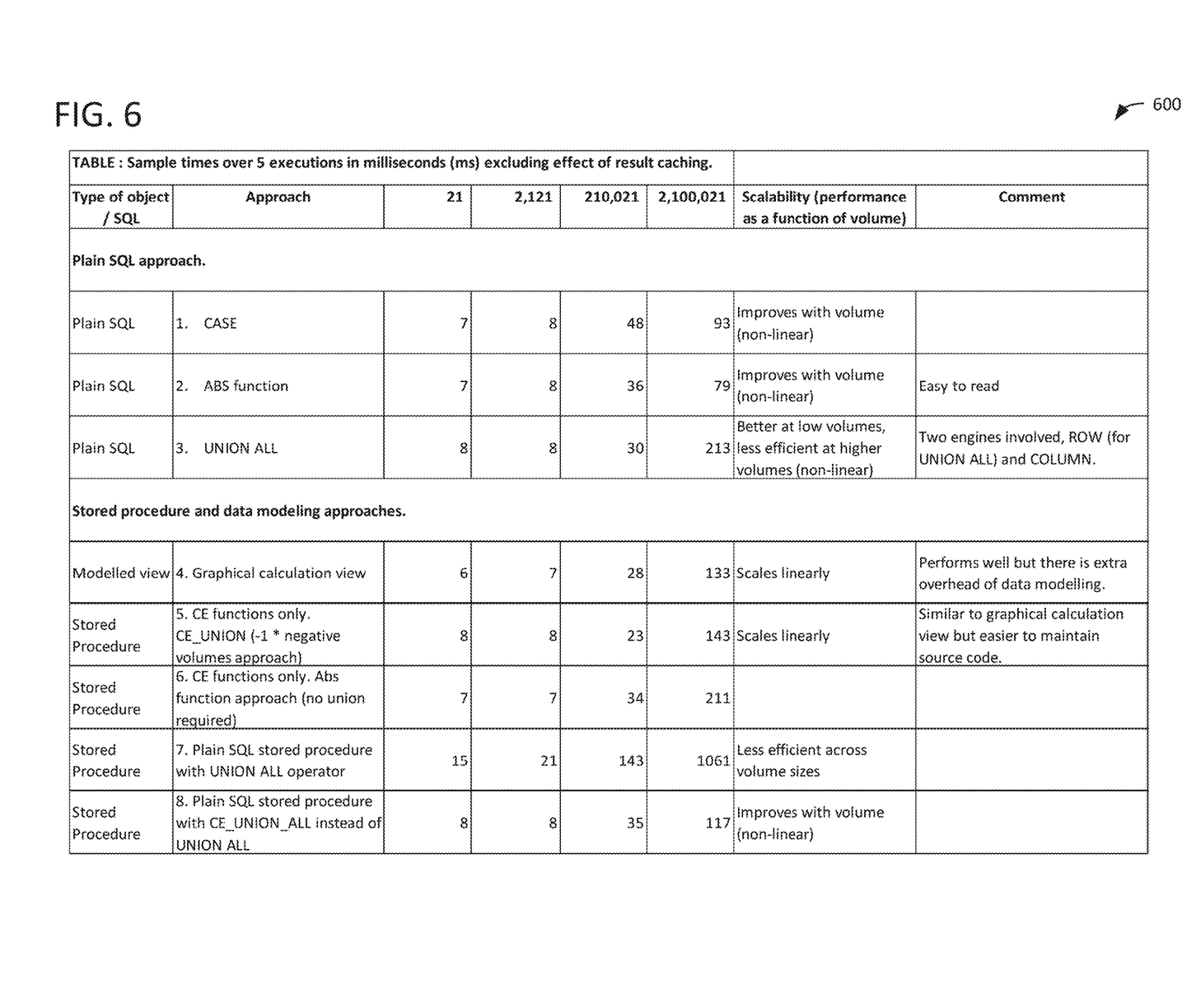
FIG. 6 is table presenting example scalability results for different query approaches.
Figure 7:
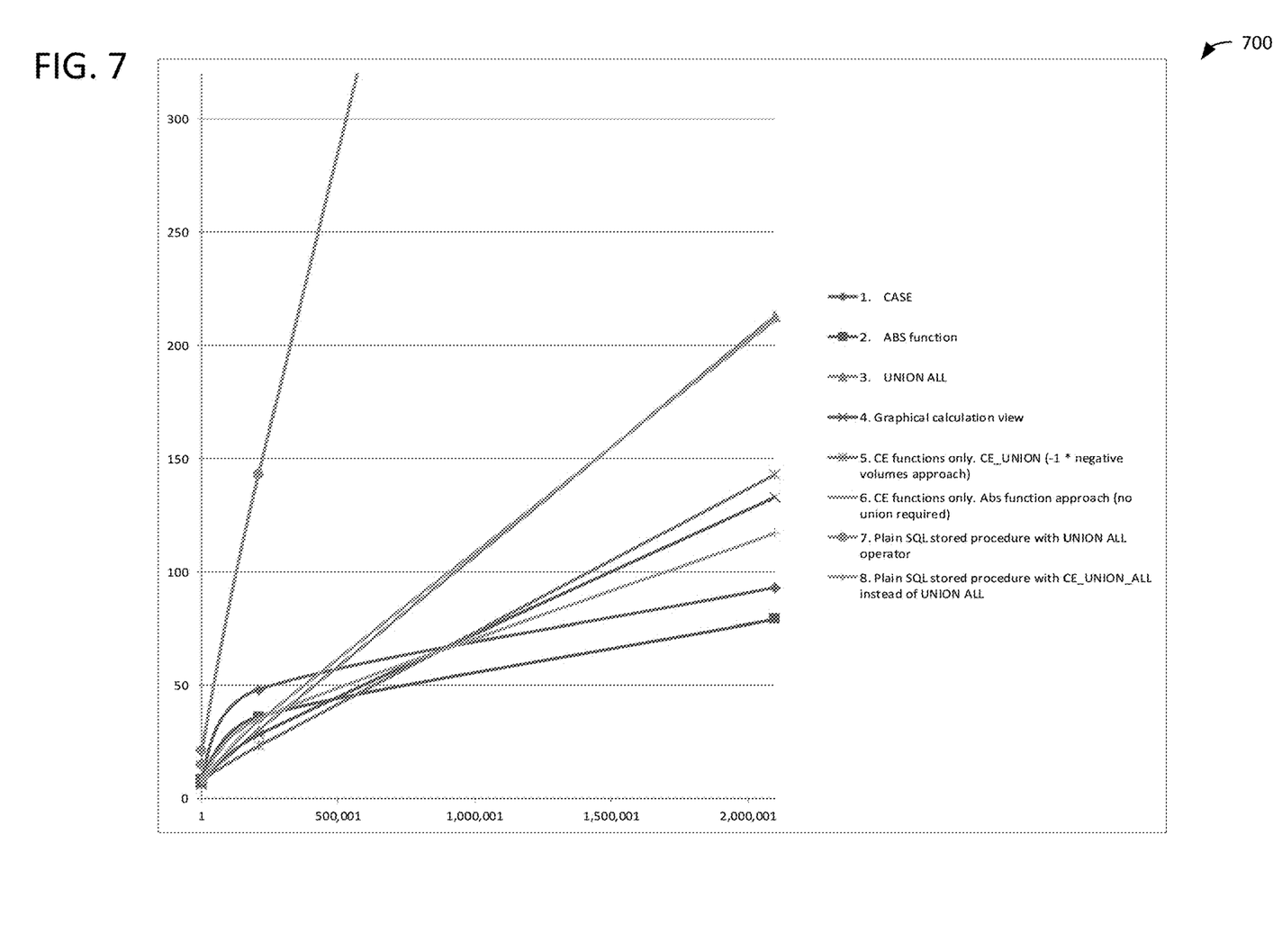
FIG. 7 is a graphical representation of the results shown in FIG. 6.

FIGS. 6 and 7 illustrate the scalability of different approaches. FIG. 6 shows a table 600 listing three plain SQL approaches (CASE, ABS function, and UNION ALL) and five data modeling and/or stored procedures approaches (graphical calculation view, CE functions only using CE_UNION, CE functions only using ABS, plain SQL stored procedure with UNION ALL, and plain SQL stored procedure with CE_UNION_ALL instead of UNION ALL). Table 600 shows the execution time of each approach in milliseconds for four different data volumes (sample sizes). Graph 700 of FIG. 7 shows a graphical representation of the results shown in table 600 of FIG. 6.

Examples of Computing Environments

Figure 8:
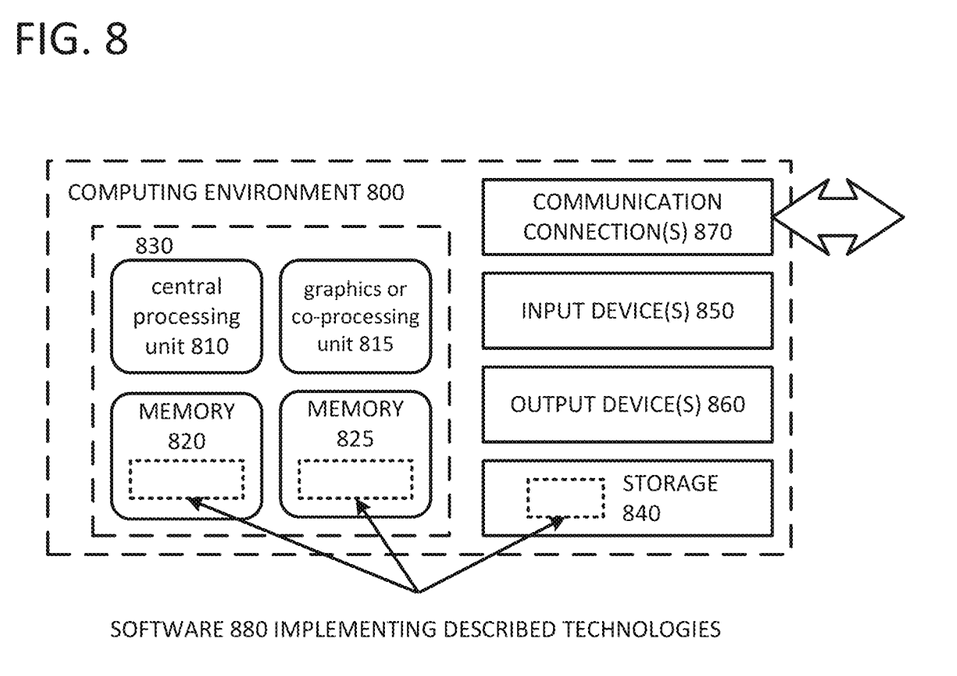
FIG. 8 is a diagram illustrating a generalized implementation environment in which some described examples can be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, media player, gaming system, mobile device, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820 and 825 and software 880 can store computer-executable instructions for improving the efficiency of database queries.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. For video encoding, the input device(s) 850 may be a camera, video card, TV tuner card, or similar device that accepts video input in analog or digital form, or a CD-ROM or CD-RW that reads video samples into the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Pert, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. One or more non-transitory computer-readable storage media storing instructions that, when executed by a computing device, perform a method of improving efficiency of a database query, the method comprising:
   receiving a database query;
   identifying one or more query portions of the database query as candidates for replacement;
   subsequent to identifying the candidates for replacement, generating a plurality of alternative queries as candidates for replacing the received database query, the respective alternative queries including at least one substitute query portion in place of at least one of the candidates for replacement;
   determining an expected performance of the received database query and expected performances of the respective alternative queries wherein determining the expected performance comprises simulating the received database query and simulating the respective alternative queries using a sample dataset that is a subset of a full dataset targeted by the received database query;
   based at least in part on the expected performance of the respective alternative queries, selecting one of the plurality of alternative queries as a replacement database query for the received database query.

2. The non-transitory computer-readable storage media of claim 1, wherein determining the expected performance comprises performing some of the at least some of the plurality of alternative queries on a sample dataset.

3. The non-transitory computer-readable storage media of claim 1, wherein the expected performance is a completion time for a respective alternative query, and wherein the one or more replacement database queries have faster completion times than the received database query.

4. The non-transitory computer-readable storage media of claim 1, wherein the identifying one or more query portions of the database query as candidates for replacement comprises:
   parsing the received database query; and
   comparing query portions identified through the parsing to a set of query rules, the query rules having associated substitute query portions.

5. The non-transitory computer-readable storage media of claim 4, wherein at least some of the query rules relate to parallel processing or to a type of query engine used.

6. The non-transitory computer-readable storage media of claim 1, wherein the received database query is a structured query language (SQL) query.

7. The non-transitory computer-readable storage media of claim 6, wherein the plurality of alternative queries comprises at least one of: an alternative SQL query, an alternative query comprising a stored procedure, including a stored procedure using CE operators, a data modeling view query, an information model, a SQL view, or code that uses an underlying database engine application program interface (API).

8. The non-transitory computer-readable storage media of claim 1, wherein the method further comprises performing the replacement database query.

9. A computer-implemented method of improving efficiency of a database query, the method comprising:
receiving a structured query language (SQL) query;
parsing the SQL query into a plurality of query portions;
subsequent to parsing the SQL query, forming a plurality of alternative queries as candidates for replacing the received SQL query, the respective alternative queries including at least one substitute query portion in place of at least one of the plurality of query portions;
simulating performance of the received SQL query and simulating performance of the plurality of alternative queries using a sample dataset that is a subset of a full dataset targeted by the received SQL Query;
based at least in part on results of the simulating, selecting a subset of the plurality of alternative queries;
performing the respective alternative queries of the subset using a sample dataset; and
based at least in part on the performing, selecting an alternative query of the subset as a replacement database query for the received SQL query.

10. The computer-implemented method of claim 9, wherein the alternative queries of the subset have a simulated completion time faster than a simulated completion time of the received SQL query.

11. The computer-implemented method of claim 9, wherein forming the plurality of alternative queries comprises identifying one or more query portions of the plurality of query portions as candidates for replacement based on a set of query rules.

12. The computer-implemented method of claim 9, wherein at least one of the plurality of alternative queries is configured to: perform a greater percentage of processing as parallel processing as compared to the received SQL query or decrease a number of calculation engine operators as compared to the received SQL query.

13. The computer-implemented method of claim 9, wherein the received SQL query is specified to be applied against a dataset in a database.

14. The computer-implemented method of claim 9, wherein the plurality of alternative queries comprises at least one of: an alternative SQL query, an alternative query comprising a stored procedure, including a stored procedure using CE operators, a data modeling view query, an information model, a SQL view, or code that uses an underlying database engine application program interface (API).

15. One or more server computers implementing a database query improvement system, the system comprising:
a query parser that receives a database query and parses the database query into a plurality of query portions;
a query rules data store containing a plurality of query rules, the respective query rules specifying at least one or more query portions and one or more corresponding substitute query portions;
an alternative query generator that generates a plurality of alternative queries as candidates for replacing the received database query based on the plurality of query portions of the received database query and at least some of the plurality of query rules; and
a query evaluation engine that:
determines an expected performance of at least some of the plurality of alternative queries; and
based at least in part on the expected performance, selects one or more of the at least some of the plurality of alternative queries as replacement database queries for the parsed database query,
wherein the query evaluation engine comprises:
a performance simulator that simulates performance of the received database query and simulates performance of the plurality of alternative queries using a sample dataset that is a subset of a full dataset targeted by the received database query and identifies a group of the plurality of alternative queries having lower simulated query completion times than other alternative queries of the plurality of alternative queries and the received database query; and
a performance estimator that performs the alternative queries of the group on a sample dataset.

16. The one or more server computers of claim 15, wherein the received database query is a structured query language (SQL) query, and wherein the one or more query portions comprise at least one of an operator, a statement, a function, an expression, or a clause.

17. The one or more server computers of claim 16, wherein the plurality of alternative queries comprises at least one of: an alternative SQL query, an alternative query comprising a stored procedure, including a stored procedure using CE operators, a data modeling view query, an information model, a SQL view, or code that uses an underlying database engine application program interface (API).

18. The one or more server computers of claim 15, wherein the replacement database queries have a faster performance time than the received database query.

* * * * *